United States Patent Office 3,171,427
Patented Mar. 2, 1965

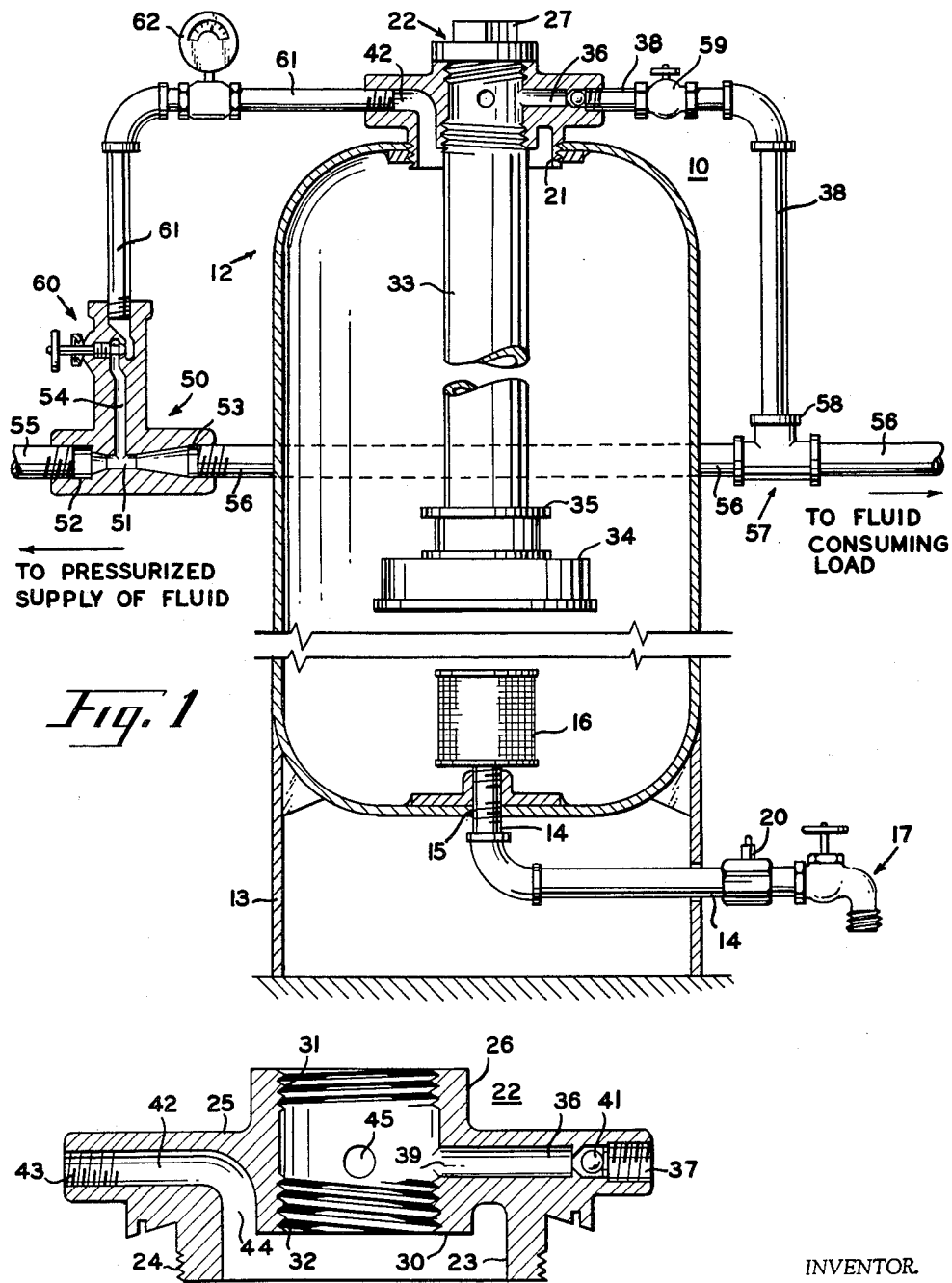

3,171,427
CONSTANT FEED CHEMICAL FEEDERS
Russell M. McAlpine, Robbinsdale, Minn.
(1333 Kentucky Ave., Minneapolis 26, Minn.)
Continuation of abandoned application Ser. No. 135,197, Aug. 31, 1961. This application June 28, 1962, Ser. No. 206,086
8 Claims. (Cl. 137—268)

This invention relates to a constant feed chemical feeder system and apparatus therefor and is a continuation of my prior application Serial No. 135,197, filed August 31, 1961, now abandoned.

One aspect of the present invention is to provide an improved constant feed chemical feeder which overcomes several shortcomings of prior art feeders. Broadly the chemical feeder system comprises a tank adapted to receive bulk chemicals and having an outlet and an inlet; venturi means having a supply port, an outlet port, and a suction port; means connecting said suction port to said tank outlet; means connecting said outlet port of said venturi means to said tank inlet, said supply port of said venturi means being adapted to be connected to a pressurized supply of fluid, and said outlet port of said venturi being adapted to be connected to a fluid consuming load.

While prior chemical feeders have utilized venturi units for drawing chemicals into a moving stream of fluid, a key aspect of the present invention is to have the venturi unit uniquely connected to the bulk chemical tank. More specifically, and as indicated above, the inlet of the tank is connected at some point "downstream" from the venturi. This closed system results, during operation, in treated fluid being used to replace the concentrated fluid which is sucked or drawn out of the tank by the venturi action. As will be discussed below, this produces the very advantageous result of eliminating a flocking action or precipitation action within the bulk chemical tank. In prior systems untreated fluid, e.g. raw untreated water, is used to replace fluid which is consumed or withdrawn from the feeder and such systems will not operate satisfactorily when used for feeding many chemicals because the raw water will contain minerals which will "flock out" or precipitate out of solution and the solid precipitate will then clog up metering valves to upset the balance of the system.

My system operates on a constant maximum saturation principle. Bulk chemical in the tank is dissolved by fluid and the fluid always is fully saturated. As fluid is consumed by the fluid consuming load, the flow of fluid through the venturi will automatically suck or draw from the chemical tank an amount of saturated fluid in precise proportion to the main flow. My system will maintain a given percentage addition of chemical to the fluid being consumed for all flow rates ranging from maximum to minimum load consumption rates. For example one extreme of load conditions is with full line or source pressure applied to the supply port of the venturi and with the load consuming only a "trickle" of fluid; the system will maintain the same proportion or ratio of chemical as when the load is maximum.

I also provide for use in my improved system a unique bulk chemical tank. When feeding some chemicals such as calcium hyperchlorite to water in a water chlorinating system, trouble can be experienced when an excessive amount of bulk chemical is placed in the tank. When water is added to such bulk chemical, the chemical reaction will develop excessively high pressures and can cause the rupture of the tank and/or other parts of the system. This obviously is very undesirable. Expensive equipment and other property may be ruined, and dangerous chemical fumes may be released. My unique fill pipe and baffle arrangement provides a fool-proof means for allowing only a safe amount of bulk chemical to be added to the tank, it being impossible to add more than a safe amount.

The present system is a completely closed system wherein the chemicals are protected for substantial periods from deterioration caused by contact with the atmosphere.

An object of the invention therefore is to provide an improved chemical feeding system and apparatus therefor.

Another object of the invention is to provide a closed system chemical feeder wherein undesirable flocking is prevented; wherin a constant ratio of chemical is added regardless of the rate of consumption by the load.

Another object of the invention is to provide a unique tank for use in a chemical feeder system which permits convenient and safe addition of bulk chemical.

Other objects of the invention will become evident upon a reading of the following detailed description and claims in connection with the drawings in which:

FIGURE 1 depicts one embodiment of my improved system; and

FIGURE 2 depicts a special fitting used in the system shown in FIGURE 1.

Referring to the drawing, in FIGURE 1 the reference numeral 10 generally depicts a constant feed chemical feeder system which comprises in part a chemical feeder storage tank 12. As depicted, tank 12 is a hollow elongated container adapted to be mounted with its principal axis in a vertical position. For mounting purposes, a suitable base means 13 is attached to the bottom of the tank 12.

Means are provided for emptying the tank when desired. This means includes an outlet pipe or conduit means 14 connected into a central aperture 15 in the bottom of tank 12. A suitable strainer 16 is attached within the tank 12 to the conduit 14. The conduit 14 terminates with a suitable drain cock or valve 17. A pressure relief valve 20 is provided in conduit 14 for safety purposes to insure against any undesired excessive pressures within tank 12.

A substantial threaded opening 21 is provided centrally in the top of tank 12. A special fitting 22 is secured in opening 21. Fitting 22 is disclosed in detail in FIGURE 2 and includes a hollow cylindrical base portion 23, the outer periphery of which is provided with threads 24 for fastening into aperture or opening 21. Base portion 23 is open on the lower end as depicted and closed off on the top as depicted by a cover portion 25, having a central raised shoulder or annular boss portion 26. Annular boss portion 26 serves as a bulk chemical filling port and is adapted to be closed off by a suitable plug element 27 (see FIGURE 1). The cover portion 25 also has an internal annular shoulder 30 which serves as a fill pipe port and which is in register with shoulder 26. Shoulders 26 and 30 are internally threaded as at 31 and 32, threads 31 coacting with suitable threads on plug 27 and threads 32 coacting with a fill pipe 33. More specifically, and as shown in FIGURE 1, one end of fill pipe 33 is connected into shoulder 30 and extends down into tank 12 a substantial amount. A suitable baffle plate 34 is connected by suitable means to the lower end of fill pipe 33. Baffle plate 34 preferably is made out of a flexible plastic material so that it may be inserted through the relatively smaller threaded opening 21. Baffle plate 34 has a cuplike shape with a central apertured collar 35 for attachment to the bottom end of fill pipe 33. It will be noted that baffle plate 34 extends radially toward the side of tank 12 a substantial amount. Its function will be explained below in connection with a description of the proper filling of the tank with bulk chemicals (not shown).

Fitting 22 further comprises an inlet port 36 having an outer opening 37 and an inner opening 39. Opening 37 is suitably threaded to receive a pipe or conduit 38. A suitable ball check valve means 41 is provided in the inlet port and permits fluid flow in only one direction, namely from opening 37 toward exit opening 39. As will be noticed in FIGURE 1, fluid entering inlet port 36 flows from exit opening 39 thereof into fill pipe 33 and thence into tank 12.

An outlet 42 is also provided in fitting 22. It included an outer suitable threaded opening 43 and an internal opening 44 adjacent the inner surface of base portion 23. By reference to the drawings it will be noted that when the fill pipe 33 is attached to the fitting 22, fluid cannot flow from inlet 36 directly to the outlet 42; it first must flow down the fill pipe 33 into the portion of the tank containing the bulk chemicals (not shown).

Fitting 22 also has a vent port 45 communicating between the inner surface of shoulders 26 and 30 and the outer surface of fitting 22. Normally vent port 45 is closed off by suitable means such as a plug or a cap.

My system further includes a constant feed venturi 50 shown somewhat schematically and in cross-section in FIGURE 1. Venturi 50 may take various forms known to those skilled in the art for satisfying the intended purpose. Venturi 50 includes a mid-section of reduced or restricted cross-section opening 51, a supply port or opening 52 suitably internally threaded, an outlet or discharge port or opening 53 suitably threaded, and a suction port 54 which communicates with the reduced section 51.

Supply port 52 is adapted to be connected by suitable fluid conduit or pipe means 55 to a pressurized supply of fluid such as a supply pipe leading to a water main or pump. Outlet port 53 is adapted to be connected by suitable fluid conduit or pipe means 56 to a fluid consuming load such as a poultry watering system. Where the source of pressurized fluid is a pump, outlet port 53 may well be connected to the load by a suitable pressure tank means (not shown).

The downstream side of the venturi unit 50 is connected by suitable fluid conduit means to the inlet port 36 of the fitting 22. Various arrangements for this can be used, the one illustrated consisting of a suitable T-fitting 57 cut into the main feed line 56 supplying the fluid consuming load. Thus the main fluid flow passes straight through T-fitting 57. The fitting 57 has an opening 58 which is connected by the previously mentioned conduit 38 to the inlet port 36 of the fitting 22. A suitable gate valve 59 in conduit 38 between the fitting 57 and fitting 22 provides a means of controlling fluid flow into the tank 12 from line 56.

The inlet 36 may be connected to the downstream side of venturi 50 in other ways which will be understood by those skilled in the art. For example, if the fluid system uses a pump and pressure tank (not shown), then the conduit means 38 may connect the inlet 36 to the load side of the pressure tank.

My system further preferably includes a manually operable regulating or metering valve 60 for regulating the rate of feeding chemicals into the fluid being consumed. Valve 60 and suitable fluid conduit means 61 connect the suction port 54 of venturi 50 to the threaded opening 43 of the outlet 42 of fitting 22. A combination pressure and vacuum gauge 62 is connected into conduit 61 and provides a convenient means for determining the pressure in the tank 12. This is useful during filling as will be explained below.

*Operation*

The relationship of venturi 50 and fitting 22 to the remaining portions of the system 10 have been indicated above. To review briefly, supply port 52 of venturi 50 is adapted to be connected to a pressurized supply of fluid while outlet port 53 is adapted to be connected to the fluid consuming load. Inlet 36 of fitting 22 is also to be connected to the down-stream side of the venturi 50.

The object of the system is to feed chemicals into a system at a controlled rate based on the consumption of fluid being utilized. For example the present system may be used for chlorinating water or to add bio-chemicals to a drinking water supply system for humans, poultry, or controlled chemical feeding to animals. It is desirable to assure the feeding of chemicals only during the consumption of fluid so as to maintain accurate control over the concentration. Prior systems have had the serious disadvantages of not being able to maintain this accurate control. Obviously factors of wasted chemicals or dangerous concentrations of chemicals are involved in these prior systems.

To utilize the present system, valves 60 and 59 are closed. This will be indicated by a zero pressure indication on gauge 62. If desired, only gate valve 59 may be closed for the filling process. In this event and if fluid is being consumed by the load a vacuum would be indicated on gauge 62. In either case the gauge 62 is used to assure a safe condition (absence of pressure in the tank 12) prior to the filling thereof. Plug 27 is removed from fitting 22. The desired concentrated chemical either in fluid or solid (including granulated) form is poured through the opening 31 and fill pipe 33 into tank 12.

The baffle plate 34 functions to prevent overfilling of the tank with bulk chemicals that have a tendency to create abnormal pressures and/or heat when exposed to other solutions (such as high test calcium hypochlorite in tablet or granular form, when mixed with water). This is an important feature of the tank 12 and prevents improper filling of the tank by a careless or improperly trained person. The length of the fill pipe 33 and the size (radial extent) of the baffle plate 34 are predetermined according to the size (height and diameter) of the tank and also to the type of chemical to be used. Then in filling the tank with chemical the operator will pour the bulk chemical down through the opening 31 into the fill pipe. As the bottom of tank 12 fills up to the level of the baffle 34, then there will be a blocking action preventing any more chemical to be discharged from the lower end of the fill pipe. The fill pipe will itself be filled up if more chemical is added, the person filling the tank thus obtaining a visual sign that the tank has the proper amount of chemical in it. Even if the fill pipe is filled with chemical, the weight of the column of chemicals therein won't displace chemicals in the tank—this is prevented by the baffle plate 34. Thus a possibly dangerous over-filling of the tank is prevented.

At this point, the tank 12 is partially filled with chemicals. The remaining portion is then filled with fluid from the supply. This may be conveniently accomplished by opening vent 45 to the atmospheric pressure and then partially opening regulating valve 60. Fluid then flows from the source of pressurized fluid through conduit 55, venturi opening 52, suction port 54, valve 60, conduit 61, and outlet 42 to tank 12. Any air in the tank is forced out through vent 45. When the tank is purged of air (as is evidenced by fluid beginning to flow out of vent 45), then the vent 45 is sealed off. Gate valve 59 is opened full. At this time the gauge 62 will permit determining whether or not the lines 61 and 38 are open and in operation. The fluid flow through the venturi 50 from supply port 52 to the outlet port 53 is a direct function of fluid being consumed by the load. A suction is developed at the suction port 54 as a function of the rate of flow and will serve to cause a flow of the concentrated chemical (as dissolved in the tank 12) from tank 12 through fitting outlet 42, conduit 61, regulating valve 60, and suction inlet 54 of venturi 50 to be added to the primary fluid flowing through the venturi. The regulating valve 60 is adjusted to set the desired chemical feed rate.

It will be understood that my system feeds chemical into the fluid being consumed by the load only when fluid is being consumed by the load. If no fluid flows through venturi 50, then no suction is developed at suction port 54 and accordingly no concentrated chemical is withdrawn from the tank.

When a suction is developed by the venturi 50, then concentrated chemical which is withdrawn from tank 12 in liquid form is replaced by new fluid through conduit 38.

Once the regulating valve 60 has been set to feed the proper or desired amount of saturated fluid to the fluid being consumed by the load, then the same proportion of chemical added will be maintained by the system regardless of great fluctuations in the rate of fluid consumption by the load.

The advantage of having the tank inlet 36 connected to the "downstream" side of the venturi 50 is very great and its significance should be understood. It results, under steady state operation, in treated or chemically added fluid being used to replace the concentrated or saturated fluid which is withdrawn from the tank by the venturi action. Thus, once the system has been in use, raw fluid such as raw untreated water is never brought directly into the tank 12. To the contrary, only treated water is used for replacing withdrawn fluid. This has the advantage of substantially eliminating any "flocking" or precipitation action in the tank 12 and accordingly prevents any such precipitate from clogging restrictions such as the regulating valve. To explain further, some prior chlorinations absolutely cannot be used in some areas for chlorinating water because of high mineral content in the water; the minerals are flocked out of the water when the water is added to the chlorinator and very rapidly a thick crust or heavy scum will form within the tank effectively eliminating its utility. In my system, I replace concentrated fluid withdrawn from the tank with treated fluid of the type being consumed by the load. In this manner, no adverse flocking takes place in the tank and long trouble-free service is enjoyed. Costly maintenance and repair is eliminated. Also, with my arrangement, the tank and metering valve 60 remain "clean" and thus the accuracy of the setting of valve 60 is preserved indefinitely. This is in contrast to prior systems where deposits, scum, precipitates, or the like would tend to clog off or otherwise restrict the metering valve and destroy the accuracy of the setting.

During normal operation, draincock 17 is closed. Pressure relief valve 20 functions only if an excessive pressure should be created or applied to pressure tank 12. Strainer 16 may be used for draining purposes to maintain bulk solid chemicals in the tank while permitting fluids in the tank to be removed.

While I have shown a specific embodiment of my system, further embodiments are possible and will occur to those skilled in the art. Accordingly, I wish the present invention to be construed as defined in the following claims.

I claim:

1. A constant feed chemical feeder system comprising: a hollow tank enclosure having an opening in the top thereof; a fitting secured in said opening, said fitting having an inlet, an outlet, a bulk chemical filling port, a fill pipe port in register with said filling port, and controllable vent means; a fill pipe connected to said fill pipe port and extending down into said tank enclosure; baffle means connected to the bottom of said fill pipe and radially extending therefrom; means for closing off said filling port; a venturi element having a supply port, an outlet port, and a suction port; valve means; means including said valve means and fluid conduit means connecting said suction port to said outlet of said fitting, said supply port of said venturi being adapted to be connected to a pressurized supply of fluid, and said outlet port of said venturi element being adapted to be connected to a fluid consuming load; check valve means; and means including fluid conduit means and said check valve means connecting said outlet port of said venturi element to said inlet of said fitting.

2. A constant feed chemical feeder system comprising: a hollow tank enclosure having an opening in the top thereof; a fitting secured in said opening, said fitting having an inlet, a bulk chemical filling port, and a fill pipe port in register with said filling port, a fill pipe connected to said fill pipe port and extending down into said tank enclosure; means for closing off said filling port; a venturi element having a supply port, an outlet port, and a suction port; valve means; outlet means on said tank; means including said valve means and fluid conduit means connecting said suction port to said tank outlet means, said supply port of said venturi being adapted to be connected to a pressurized supply of fluid, and said outlet port of said venturi element being adapted to be connected to a fluid consuming load; and means including fluid conduit means connecting said outlet port of said venturi element to said inlet of said fitting.

3. Apparatus as described in claim 2 further characterized by said inlet of said fitting being arranged so that fluid entering said tank through said inlet must flow through said fill pipe port and said fill pipe connected thereto.

4. A constant feed chemical feeder system comprising: a hollow tank enclosure having an inlet, an outlet, and a bulk chemical filling port; a fill pipe connected to said bulk chemical filling port and extending down into said tank enclosure; means for closing off said filling port; a venturi element having a supply port, an outlet port, and a suction port; valve means; means including said valve means and fluid conduit means connecting said suction port to said outlet of said tank, said supply port of said venturi being adapted to be connected to a pressurized supply of fluid, and said outlet port of said venturi element being adapted to be connected to a fluid consuming load; and means including fluid conduit means connecting said outlet port of said venturi element to said inlet of said tank.

5. Apparatus as described in claim 4 further characterized by said tank inlet and said tank bulk chemical filling port being connected so that fluid entering said tank through said tank inlet must flow through said tank fill pipe connected to said bulk chemical filling port.

6. Apparatus as described in claim 4 further characterized by baffle means being provided on the lower end of said fill pipe and extending substantially therefrom in a radial direction.

7. A constant feed fluid-type chemical feeder system comprising: a hollow tank enclosure having an inlet, an outlet, and a bulk chemical filling port; a fill pipe connected to said inlet and extending into said tank enclosure; means for closing off said bulk chemical filling port; venturi means having a supply port, an outlet port, and a suction port; fluid conduit means connecting said suction port to said outlet of said tank so that when a suction exists at said suction port concentrated fluid is withdrawn from said tank to combine with fluid flowing into said supply port and out the outlet port of said venturi means to thereby form treated fluid, said supply port of said venturi being adapted to be connected to a pressurized supply of fluid, and said outlet port of said venturi means being adapted to be connected to a fluid consuming load; fluid conduit means connecting said outlet port of said venturi means to said inlet of said tank so that treated fluid is used to replenish the fluid withdrawn from said tank, said treated fluid flowing through said tank inlet and thence through said fill pipe into said tank so as to come into contact with chemicals in said tank to form a concentrated solution therewith; and valve means for controlling the flow of concentrated fluid from said tank to said suction port of said venturi means.

8. A constant feed fluid-type chemical feeder system comprising: a hollow tank enclosure having an inlet, an outlet, and a bulk chemical filling port; means for closing off said bulk chemical filling port; venturi means having a supply port, an outlet port, and a suction port; fluid conduit means connecting said suction port to said outlet of said tank so that when a suction exists at said suction port concentrated fluid is withdrawn from said tank to combine with fluid flowing into said supply port and out the outlet port of said venturi means to thereby form treated fluid, said supply port of said venturi means being adapted to be connected to a pressurized supply of fluid, and said outlet port of said venturi means being adapted to be connected to a fluid consuming load; fluid conduit means connecting said outlet port of said venturi means to said inlet of said tank so that treated fluid is used to replenish the fluid withdrawn from said tank, said treated fluid flowing through said tank inlet and thence into contact with chemicals in said tank to form a concentrated solution therewith; and valve means for controlling the flow of concentrated fluid from said tank to said suction port of said venturi means.

References Cited in the file of this patent
UNITED STATES PATENTS

| | | |
|---|---|---|
| 708,757 | Davidson | Sept. 9, 1902 |
| 2,031,873 | Williams | Feb. 25, 1936 |
| 2,283,093 | Rosenthal | May 12, 1942 |
| 2,703,176 | Shuldener | Mar. 1, 1955 |
| 2,857,202 | Snyder | Oct. 21, 1958 |
| 2,932,317 | Klosse | Apr. 12, 1960 |
| 2,984,250 | Foster | May 16, 1961 |
| 3,017,118 | Kane | Jan. 16, 1962 |